(12) United States Patent
Strohm et al.

(10) Patent No.: US 6,669,844 B2
(45) Date of Patent: Dec. 30, 2003

(54) FILTRATION DEVICE WITH STACKED DEEP-BED FILTER ELEMENTS

(75) Inventors: Gerhard Strohm, Dexheim (DE); Georg Schnieder, Bad Kreuznach (DE); Wolfgang Hepp, Alzey (DE)

(73) Assignee: Pall Corporation, East Hills, NY (US)

( * ) Notice: Subject to any disclaimer, the term of this patent is extended or adjusted under 35 U.S.C. 154(b) by 8 days.

(21) Appl. No.: 09/355,803

(22) PCT Filed: Feb. 9, 1998

(86) PCT No.: PCT/EP98/00683
§ 371 (c)(1),
(2), (4) Date: Aug. 3, 1999

(87) PCT Pub. No.: WO98/35741
PCT Pub. Date: Aug. 20, 1998

(65) Prior Publication Data
US 2003/0141239 A1 Jul. 31, 2003

(30) Foreign Application Priority Data
Feb. 15, 1997 (DE) .......................... 197 05 855

(51) Int. Cl.[7] .......................... B01D 25/00; B01D 25/12
(52) U.S. Cl. .......................... 210/224; 55/482; 210/231; 210/314; 210/331; 210/346; 210/456; 210/486; 210/488
(58) Field of Search ............... 210/224, 231, 210/263, 284, 287, 247, 290, 291, 314, 316, 346, 315, 457–458, 342, 337, 338, 331, 456, 486, 488; 55/482–485

(56) References Cited

U.S. PATENT DOCUMENTS

| | | | | |
|---|---|---|---|---|
| 608,034 A | * | 7/1898 | Feroe | |
| 643,900 A | * | 2/1900 | Hottinger | |
| 2,136,200 A | * | 11/1938 | Weisser | |
| 2,459,376 A | * | 1/1949 | Hallinan | |
| 2,521,060 A | | 9/1950 | Hallinan | |
| 2,522,502 A | * | 9/1950 | Clark | |
| 2,583,423 A | * | 1/1952 | Hallinan | 210/443 |
| 2,604,994 A | * | 7/1952 | Vocelka | |
| 2,654,483 A | * | 10/1953 | Ahlijian | |
| 3,231,094 A | * | 1/1966 | Weigand et al. | |
| 3,578,176 A | * | 5/1971 | Cuyler | 210/492 |
| 3,598,242 A | | 8/1971 | Mott | |
| 3,618,783 A | * | 11/1971 | Cuyler | 210/492 |
| 4,410,430 A | * | 10/1983 | Hagler, Jr. | 210/446 |
| 4,781,828 A | * | 11/1988 | Kupka | 210/225 |

FOREIGN PATENT DOCUMENTS

| | | | |
|---|---|---|---|
| DE | 1536862 | | 1/1970 |
| DE | 34 03738 A1 | | 8/1985 |
| DE | 32 34560 C2 | | 3/1986 |
| DE | 3520171 A1 | * | 12/1986 |
| DE | 3906815 A1 | * | 9/1990 |
| DE | 3906816 C3 | * | 9/1990 |
| DE | 40 12971 A1 | | 10/1990 |
| DE | 40 12972 A1 | | 10/1990 |
| DE | 42 14694 A1 | | 11/1993 |
| DE | 4214694 | * | 11/1993 |
| EP | 0 034 417 | | 8/1981 |
| EP | 0 475 708 A1 | | 3/1992 |
| EP | 0 531 817 | | 3/1993 |
| EP | 0 671 198 | | 9/1995 |
| EP | 0 747 106 | | 12/1996 |
| GB | 570960 | * | 7/1945 |

OTHER PUBLICATIONS

Handbook of Industrial Solid–Liquid Filtration.

* cited by examiner

Primary Examiner—Joseph Drodge
(74) Attorney, Agent, or Firm—Nixon & Vanderhye P.C.

(57) ABSTRACT

The invention relates to a filtration device for deep-bed filtration which is easier to handle and enables filter modules (s) to be changed and disposed of easily. The filtration device has a casing with at least one filter module inserted in the casing with filter elements made from deep-bed filter materials stacked on top of each other. The filter elements have at least one internal structure formed by a perforation wherein the boundary surface of the perforation formed by the deep-bed filter materials creates a through-flow surface for filtrates or non-filtrates. At least one end plate has at least one inlet and/or outlet.

20 Claims, 11 Drawing Sheets

FILTRATION DEVICE WITH STACKED DEEP-BED FILTER ELEMENTS

This application is a 371 of PCT/EP98/00683, filed on Feb. 9, 1998, and claims priority of German application 197 05 855.8, filed on Feb. 15, 1997.

The invention relates to a filtration device with a housing and with at least one filter module which is inserted into the housing and which has two end plates and several filter elements located in between, the housing having openings for supplying the unfiltered material and for removing the filtered material.

In filtration, filter presses to hold filter frames for kieselguhr filtration or to hold filter frames and the filter beds which are located in between are known. In the case of filter presses for holding filter beds they generally do not have a jacket which screens the filter beds from the exterior space. Rather the unfiltered material space and the filtered material space are separated from one another and from the environment only by pressing of the filter beds and the filter frames which lie between them. But these filter frames cause up to 50% of the production costs of a corresponding apparatus. In addition, as a result of the lack of screening from the environment and the associated continually necessary monitoring, automation of the filtration process is possible only to a very limited degree.

A survey of the art can be found in Horst Gasper *Handbook of Industrial Solid-Liquid Filtration,* Huethig-Verlag 1990, p. 166ff.

In these filtration devices automation in the changing of filter elements is not possible, so that the filter elements must be inserted individually into the filter by hand before filtration and removed from the filter after filtration. However this causes high costs due to the personnel required and due to shutdown of the filtration line.

For special applications it is necessary for economic reasons that the filter can be flushed clean by reversing the flow after filtration. But this is impossible in many filtration units on the market, or the special construction of the filters causes very high additional costs.

DE 3520171 A1 discloses a filter press of horizontal design which has a protective jacket which surrounds the filter packet. The filter press requires filter frames and filter plates for sealing between the filter elements since they form the unfiltered material and filtered material spaces. Since sealing cannot take place directly between the individual filter elements, this causes much higher investment for the filter press, at the same time the filter frame and filter plates must be made very complex. Furthermore, the segmenting and the associated necessary manual outfitting of the filter press with individual filter elements cause high costs when the filter elements are changed. Filtration in these known filtration means takes place perpendicularly to the surface of the plate-shaped elements. The end plates, as in the filter means described below, form only one wall of the unfiltered material space or of the filtered material space.

A similar filter type in a vertical design is known under the product name "radium filter". This type of filter has round filter frames which are assembled externally into a filter module with a disk in between. These packages are then lifted into a corresponding housing. These filter frames during filtration form spaces for unfiltered material and for filtered material by distributing the flow. In particular the manual separation between the filter frame and the filter beds after operation of the filtration means causes very high costs and is possible only with great burdens for the personnel, for example in the case of filtration of toxic fluids or fluids with high vapor pressures, as is the case in many organic solvents. Furthermore, the precisely formed filter frames cause a high proportion of the investment costs to be borne for this filter.

DE 3906815 A1 and DE 3906816 C3 describe a filter plate and a bed filter with a space which encompasses the filter beds and which is designed to prevent environmental contamination during a leak. For operation of the bed filter a plurality of the filter plates described in DE 3906815 A1 are necessary. This increases the amount of investment for the filter device. Furthermore, due to the plurality of sealing elements between the filter plates safety during filtration is only conditionally greater than in other known filter devices. Changing of the filter beds is likewise as complex as in conventional filter devices.

A filtration device with a closed outside jacket is described on the other hand in DE 3234560 C2. In any case, for operation exactly as in the aforementioned filtration means filter frames are necessary which are called filter carriers. Here especially the manual separation of the filter carriers from the filter packings is complicated. As described in DE 3403738 C2, production of filter packings is moreover very complex since each filter body must be formed individually.

SUMMARY OF THE INVENTION

The object of the invention is to devise a filtration device for deep-bed filtration which is can be more easily handled such that replacement of the filter module or modules is easily possible and in which the modules can be easily disposed of, furthermore there being possibility of back-flushing.

This object is achieved with a filtration device in which the filter module has filter elements of deep-bed filter material which are stacked on top of one another and which have at least one inner structure formed by an opening, the boundary surface of the opening formed by the deep-bed filter material forming a flow surface for the filtered material or the unfiltered material, and at least one end plate having at least one entry and/or discharge opening.

Sheet filters and filter beds consist of deep-bed filter materials which are defined as those materials which are porous and through which flow can take place, i.e. in which convective transport of substances through the materials is possible. Deep-bed material can have organic and/or inorganic, fibrous and/or grainy substances. Raw materials for the deep-bed filter material can be for example cellulose, plastic fibers, kieselguhr, perlites or metal oxides. Here kieselguhrs and perlites can be added to the filter beds to increase the internal surface and thus the prefilt volume. Furthermore, in the cavities components of the fluid to be treated can be retained by blocking action and/or absorption/adsorption. Examples of materials which can be used for deep-bed filter needs include paper, cardboard, filter beds, membranes, porous ceramic materials, metal or polymer fabric, nonwovens, and sintered materials, for example, of metals, metal oxides, glass or polymers.

Based on their internal structure, flow through the filter element which is preferably a filter disk can take place parallel to the disk plane, incident flow being possible both via the outside peripheral surface which acts likewise as a flow surface so that the filtered material collects in the corresponding openings of the internal structure and also via the flow surfaces formed by the internal structure. In this way the filter disks can be stacked on top of one another without holding frames or the like so that a filter module can be produced from a single material. This filter module can be assembled outside of the filtration device and can be inserted as a unit into it. When the filter material must be replaced, the entire module can be removed and disposed of as a unit without additional effort, as in the prior art, for example, disassembling the module in order to remove the holding frame. This saves time and personnel.

Preferably the sum of all flow surfaces of a filter element, which is also to be understood as both the outer flow surfaces and also the flow surfaces located within the filter element, is larger than the sum of the outer peripheral surface of an extremely small convex body which jackets the filter element and the outer peripheral surface of an extremely large convex body which is inscribed into any opening of the filter element. Convex bodies are for example spheres, ellipsoids, cylinders, cones, angles, tetrahedrons or cuboids and are described in the *Small Mathematical Encyclopedia,* VEB Bibliographisches Institut, Leipzig 1979, p. 625.

Preferably in filter elements we distinguish between openings of the first and second type which are not connected to one another. The filter elements can be stacked on top of one another such that only openings of the same type are connected to one another and form channels for filtered material and unfiltered material within the filter module.

Preferably at least one filter element of the filter module has an opening which extends to the edge of the filter element and which produces a connection to the inner structure of the filter elements. When for example an incident flow from the outside is to be effected, the filter material is exposed to flow not only via the peripheral surface, but the unfiltered material can also penetrate into the interior of the filter module via the connection openings which extend as far as the edge of the filter element, so that the flow surfaces formed by the inner structure can be used without the need for corresponding feed via specially formed end plates.

Preferably the filter disks have at least one collection opening to form a filtered material collection channel in the filter module, in this case there being a corresponding discharge opening in one of the end plates. In the reverse mode of operation the unfiltered material can be delivered via this collection opening.

Furthermore, the openings and/or connection openings can have stiffening bridges in order to increase stability. Identical or different types of filter elements or filter disks can be stacked on top of one another to form a filter module.

The filter elements can preferably be made by their inner structure such that only one type of filter element is necessary in order to build an effective filtration module. The filter elements can all be stacked on top of one another in the same way. If however the inner structure makes it necessary, the individual filter elements can be twisted each against one another.

Due to the filtered material and unfiltered material channels within the filter module at least one of the end plates must have a corresponding feed and discharge opening. In the simplest case the upper end plate can be completely closed and the lower end plate has simply one discharge opening for the filtered material. This applies to the case of outside incident flow of the filter module.

When the filter module is to be exposed to incident flow from the inside, the unfiltered material is supplied via this discharge opening. At least one end plate can also be made for distributing the unfiltered material into the unfiltered material channels of the filter module and/or collecting the filtered material. Preferably in this case at least one of the end plates has the corresponding distributor channels which are connected to the corresponding openings of the first type and/or second type. The distributor channels form a communicating channel system which is connected only to the openings of one type so that no mixing of filtered material and unfiltered material can occur. The openings of the respective other type are either covered by the end plate or are connected to their own distributor system in the end plate. Which configuration of the end plate is chosen depends on the embodiment of the filter elements and the desired operating mode.

The filter elements can lie directly on top of one another, it being possible to cement or bond the filter elements to one another.

Basically the filter module as claimed in the invention requires no intermediate layers. But it can be a good idea for different reasons to use intermediate layers, films, filter disks without openings or even metal plates; especially high quality steel plates can be used. Especially when metal plates are used are they arranged at greater distances in the filter module in order not to adversely effect the disposal advantages of the module.

Intermediate layers can be used to increase the strength of the filter module when due to a complex inner structure the stability of the filter elements suffers and they tend to radial deformation. Bulging can occur when the filter module is backflushed, if this is not prevented by the intermediate layers.

Furthermore, intermediate layers provide for segmenting of the filter module, facilitating installation, because the module can be composed of several parts which can be easily handled. Instead of speaking of segmenting of a filter module, it is also possible to speak of several filter modules which are stacked on top of one another, and in this case the intermediate plates could then be called end plates.

When the intermediate layers consist of deflection-resistant material, such as for example high quality steel with the corresponding thickness, for example 3 mm, these intermediate plates also contribute to greater uniformity of contact pressure.

Preferably the filter module is located perpendicularly in the housing, by which installation and disassembly are facilitated. Moreover the vertical arrangement is advantageous for good venting.

Advantageously one of the two end plates, especially the upper end plate, is movably supported so that the swelling capacity and thus the expansion of the filter element stack can be considered. In the housing there can be a pressing device which preferably engages the movably supported end plate. This pressing device can act from the top and/or from the bottom on the filter module.

When several filter modules in the filtration device are located on top of one another and/or next to one another, there can be a common pressing device or, for each individual filter module, its own pressing device.

According to another embodiment there is at least one fixing element which fixes the filter discs in their relative position to one another at least during installation. Depending on the type of configuration of the inner structure of the filter elements the latter must be stacked on top of one another according to a certain pattern so that no short circuit occurs between the channels for the filtered material and unfiltered material. These fixing elements can interact with the recesses on the edge of the disk or also in the interior of the filter module so that the location of the filter disks to one another is explicitly fixed.

The fixing element is preferably a component of a holding means which is connected to at least one end plate. Preferably the holding means has two rods via which the two end plates can be connected to one another, the rods fitting into outside grooves of the filter module which are formed by the recesses of the filter elements. It is possible to remove the entire module from the filtration device by this holding means.

Within the filter module there can be at least one retention means. In this way further filtration can take place to again further increase the purity of the filtered fluid or to additionally reliably sterilize the fluid with membrane filtration. Here it is important that the length of the retention means which can preferably be a cartridge filter, with or without pleating, or a screen filter, be shorter than the minimum length of the filter module with maximum pressing, so that the cartridge filter is not flattened. Preferably the mobility of the end plates will be limited to prevent damage.

The retention means can be detachably fastened to one of the two end plates.

Sample embodiments of the invention are detailed below using the drawings.

DETAILED DESCRIPTION OF THE INVENTION

Figure 1:
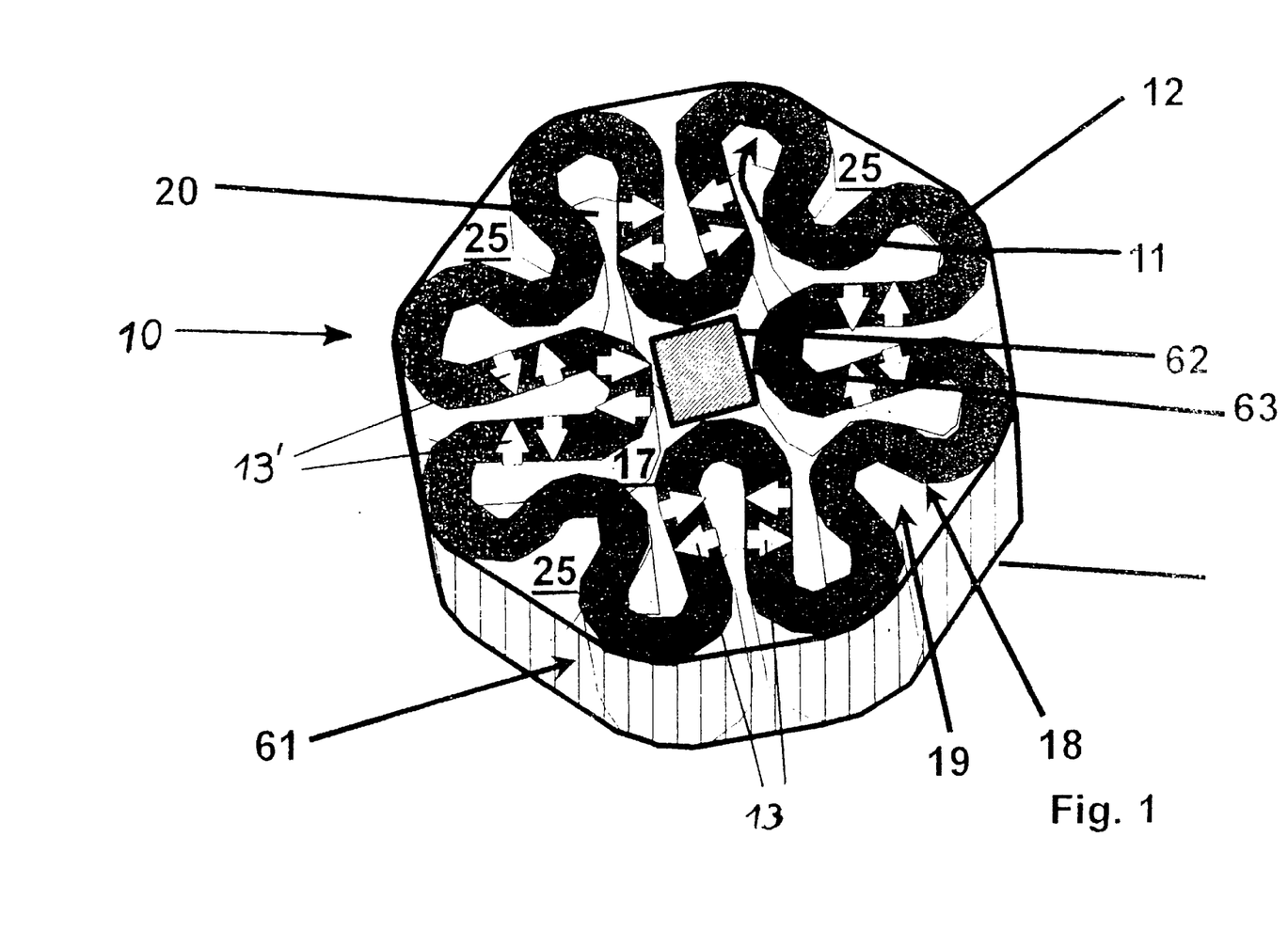
FIG. 1 shows a perspective view of one filter element.

FIG. 1 shows a flat filter element 10 which has a meander-shaped structure. After producing a conventional filter element, for example with a quadratic shape, an opening 20 is made in the filter element 10, by which the inner structure 17 is established. The surface of the opening 20 which is bordered by the deep-bed filter material 12 forms a flow surface 11 for the filtered material and unfiltered material. In this embodiment it is a finger-like opening 20 which is matched to the outside contour 18. The remaining deep-bed filter material 12 thus has a meander-shaped structure, the width of the effective filtration areas being the same everywhere.

If this filter element 10 is exposed to flow for example radially from the outside (arrow 13) via the peripheral surface 19 which then forms a flow surface, loops on the outside form spaces 25 for the unfiltered material. Within the filter element 10 the filtered material collects and is removed through a discharge hole in an end plate which is not shown.

This filter element 10 can also be exposed to flow in the reverse direction along arrow 13' from the inside to the outside. In both cases the filter element 10 is exposed to flow parallel to the plane of the filter element, therefore essentially radially.

The filter element 10 is jacketed by the smallest possible convex body (outside body) 60 which in the embodiment shown is a polyhedron with an octagonal base surface, the edges being rounded. The pertinent outside peripheral surface 61 can be imagined as a band placed around the filter element 10. Similarly, a convex body as large as possible (inside body) 62 is inserted into the opening 20 and has a peripheral surface 63. This convex inner body also has a rectangular base surface. As a result of the star shape of the filter element 10 the sum of the flow surfaces 11, 19 is larger than the sum of the surfaces 61 and 63.

Figure 2:
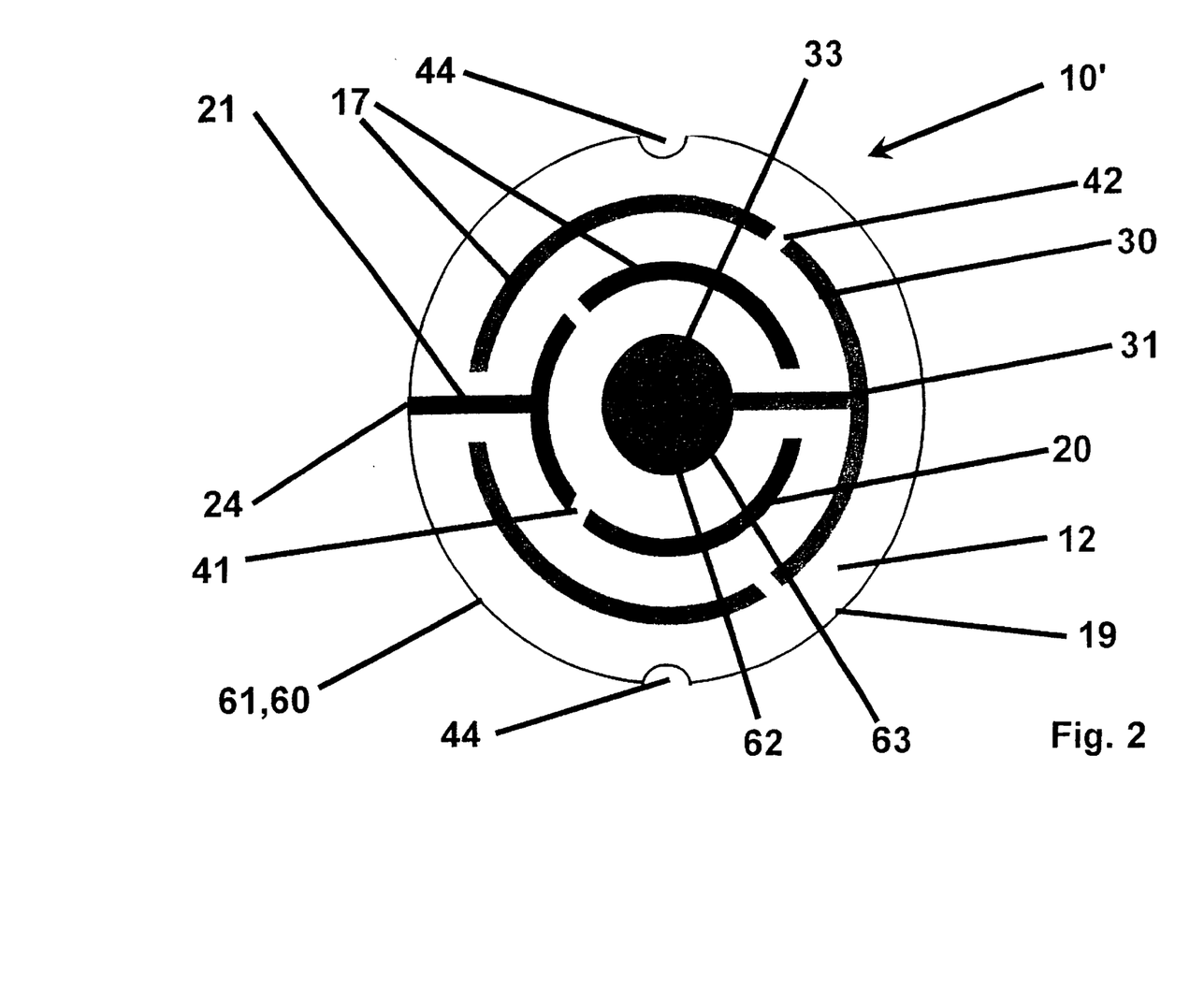
FIG. 2 shows an overhead view of a filter element according to another embodiment.

FIG. 2 shows another embodiment of a filter element 10 in the form of a disk 10' in which two concentric annular openings 20 and 30 are made in the filter disk 10'. Neither opening 20, 30 is connected to one another and they form one opening of the first type and one opening of the second type. The outside peripheral surface 61 of the convex outside body 60 is identical to the outside peripheral surface 19 of the filter disk 10' in this case.

The openings 20 and 30 are not completely closed into a ring here because in addition there are connection openings 21 and 31 which intersect the respective circles of the openings 20 and 30. The connection opening 21 establishes the connection from the opening 20 to the peripheral surface 19. The connection opening 31 extends likewise in the radial direction and joins the outer annular opening 30 to a round hole in the middle which represents a so-called collection opening 33. All openings 20, 21, 30, 31 together form the inner structure 17.

The collection opening 33 in the embodiment shown here represents the largest opening within the filter disk 10' so that the largest possible convex inside body 62 (shown by cross hatching) which is identical to the collection opening 33 can be inserted there. If the sum of all flow surfaces is compared to the sum of surface 61 and surface 63, this sum of all flow surfaces is larger.

The width of the effective filtration areas between the peripheral surface 19 and the outer opening 30 or the outer opening 30 and the inner opening 20 and between this opening 20 and the collection opening 33 is the same everywhere, so that the same filtration action is achieved everywhere in the deep-bed filter disk 10'. The disk can be operated such that the unfiltered material is supplied to the inner opening 20 via the entry of the connection opening 21 labelled 24. The filter element is thus exposed to flow not only via the peripheral surface 19, but also in the interior via the inner opening 20. The reverse mode of operation is likewise possible.

Figure 3:
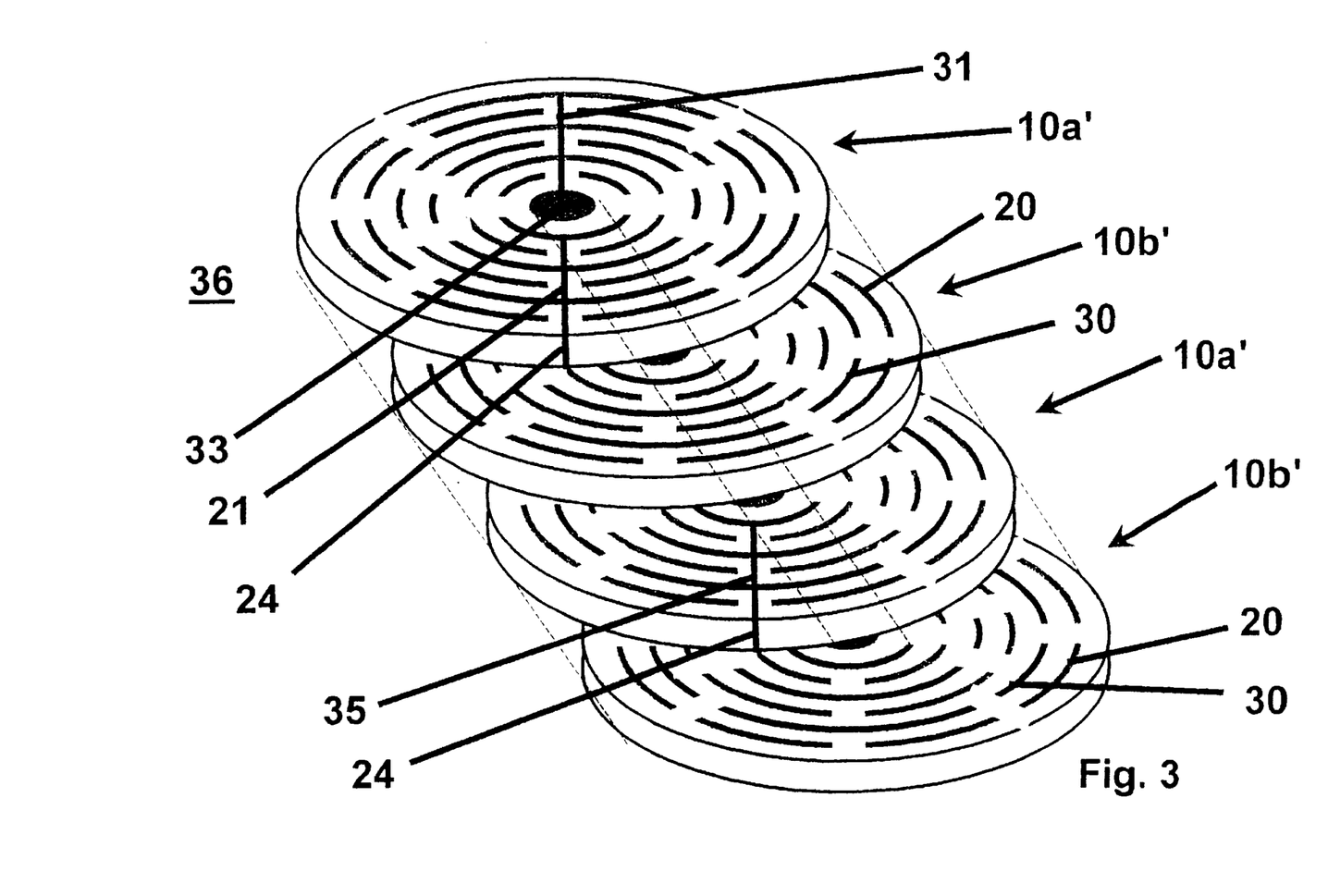
FIG. 3 shows a filter module in an exploded view.
Figure 4:
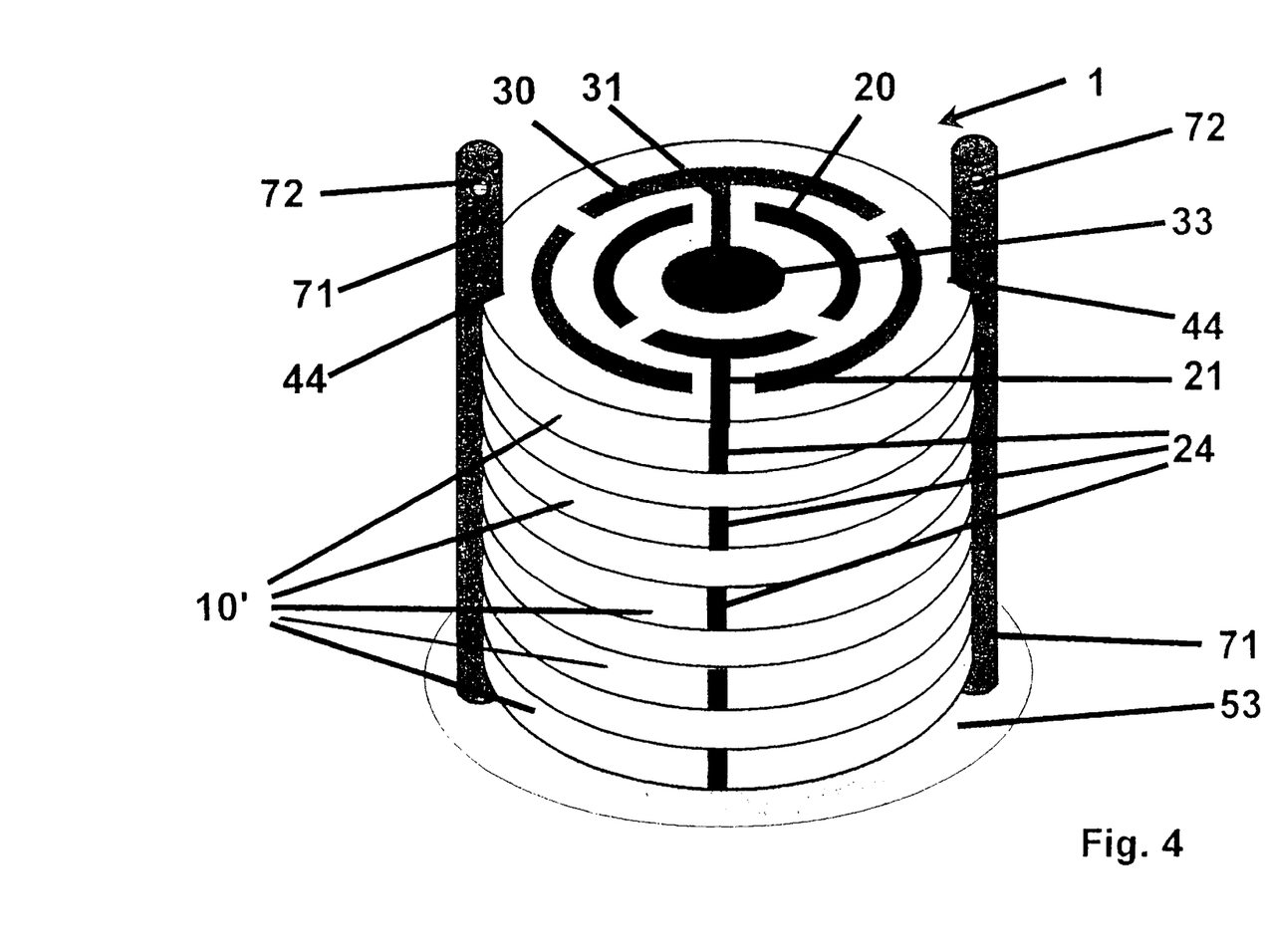
FIG. 4 shows a perspective view of a filter module.

To increase stability, in the opening 20 there are two stiffening bridges 41 which divide the opening 20 into three roughly equal-sized, arc-shaped sections. Accordingly the outside opening 30 has two stiffening bridges 42. When the filter disks 10' are stacked on top of one another to form a filter module 1, as is shown in FIGS. 3 and 4, it must be watched that the disks are exactly aligned to one another so that the connection openings 21 and 31 do not accidently cross one of the openings 20 or 30; this would lead to mixing of the filtered material and unfiltered material. Therefore it must be watched during assembly that the openings of the first type, here the openings 20, 21, cannot connect to the openings of the second type (openings 30, 31, and 33). To fix the alignment of the filter disk 10', on the peripheral surface 19 there are fixing structures 44 in the form of semicircular recesses into which the rods 71 shown in FIG. 4 fit.

FIG. 3 shows a stack of filter disks in an exploded view, two embodiments of filter disks 10a' and 10b' being placed on top of one another in alternation. The filter disk 10a' has a radial connection opening 21 with one entry 24 on the edge, while filter disks 10b' have exclusively concentric openings 20, 30. A corresponding arrangement of stiffening bridges within the openings ensures that the openings of the first type do not cross the openings of the second type. The connection openings 21, 31 are located in the area of the stiffening bridges of the filter disk adjacent at the time. The collection openings 33 on top of one another form a channel 35 for the filtered material which is shown by the broken line, while the space which surrounds the filter elements 10*a'*, *b'* forms collection channel space 36 for the unfiltered material.

FIG. 4 shows a filter module 1 which for example has nine filter disks, of which the filter disk 10' corresponds to the embodiment which is shown in FIG. 2. The filter elements are placed on an end plate 53 in which two rods 71 are attached which fit into the corresponding fixing structure 44 on the disk edge and in this way guarantee the alignment of the filter disks 10'. On the rods 71 the entire module can be grasped and removed from the filtration device. Complicated installation and removal are eliminated. Furthermore, the entire module except for the rods 71 and the end plate 53 can be disposed of as a whole without the individual disks having to be separated from one another. On the top end of the rods 71 are journals 72 which a carrying means can engage in order to lift the entire module out of the filtration device.

Figure 5:
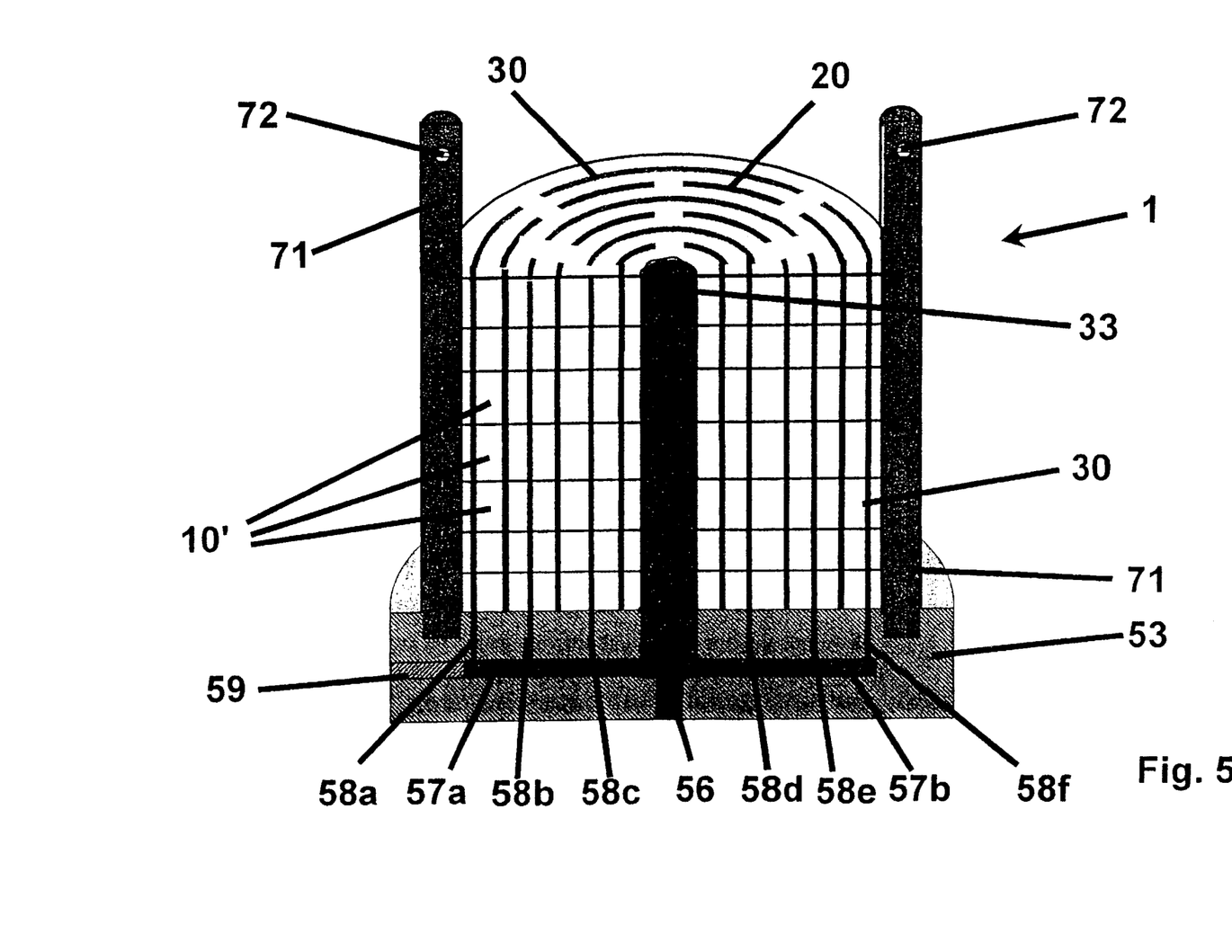
FIG. 5 shows a vertical section through a filter module.

FIG. 5 shows a section through the deep-bed filter module 1. The filter disks 10' are all made identically and are placed on top of one another in the same manner, i.e. without a twist angle, so that the openings 20 and 30 lie congruently on top of one another. In the center there is a collection opening 33 in which either the filtered material is collected or the unfiltered material is delivered. The lower end plate 53 in the area of the collection opening 33 has a feed and a discharge opening 56 into which two horizontally arranged distributor channels 57*a* and 57*b* discharge. These distributor channels 57*a*, 57*b* are connected via connection channels 58*a*–*f* to the openings 30 of the lower filter disk 10' so that the filtered material collected there can flow to the discharge opening 56 or if the mode of operation is the reverse the unfiltered material which is supplied via the feed opening 56 can reach the openings 30.

The lower end plate 53 is made such that the openings 20 of the adjacent filter disk 10' are covered and thus closed.

Figure 6:
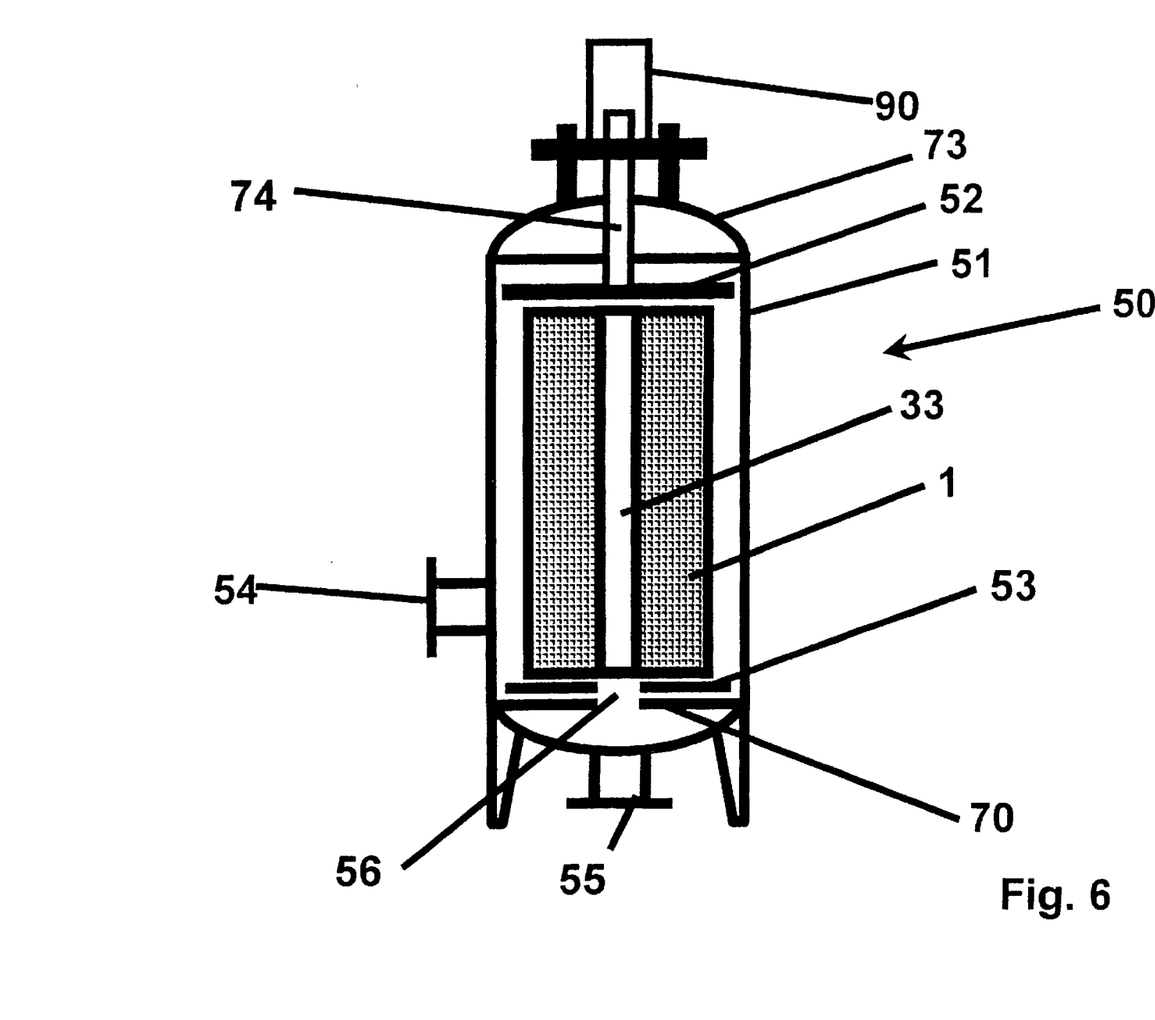
FIGS. 6–9 shows views of the filtration means as shown in different embodiments, FIGS. 10+11 show installation and disassembly of a filter module in a filtration device according to two embodiments.

This filter module according to the representation of FIG. 6 is inserted into a filtration housing 51, the unfiltered material for example entering the housing 51 through the connection 54 and after passing through the filter module leaving again via the connection 55. In the reverse mode of operation the unfiltered material is delivered via the connection 55 and the filtered material is discharged via the connection 54.

The module 1 has a lower end plate 53 which rests on a permanently installed carrier plate. Both plates 53 and 70 have one feed and discharge opening which is flush with the collection opening 33. On the top of the module 1 rests a movable upper end plate 52 which is engaged by a pressing device 90 which is installed on the cover 73 of the filtration device 50 and for example presses via a piston 74 on the upper end plate 52 and in this way presses the filter disks 10' together and fixes them. Furthermore, in this way better sealing of the end plates 52 and 53 to the filter module 1 is guaranteed. In addition, when using a pressing device exchange of the unfiltered material space and the filtered material space is possible since the end plate 52 is pressed by the pressing device 90 against the module and the filter elements are held in any operating mode. Even if in this as well as the other representations the pressing device 90 acts from overhead on the filter module 1, fundamentally pressing from underneath against the filter module 1 is also possible. When using a hydraulic assembly the pressing force can be kept constant so that uniform pressing of the filter module 1 always takes place. This ensures reliable operation of the filter module 1 at any time.

Figure 7:
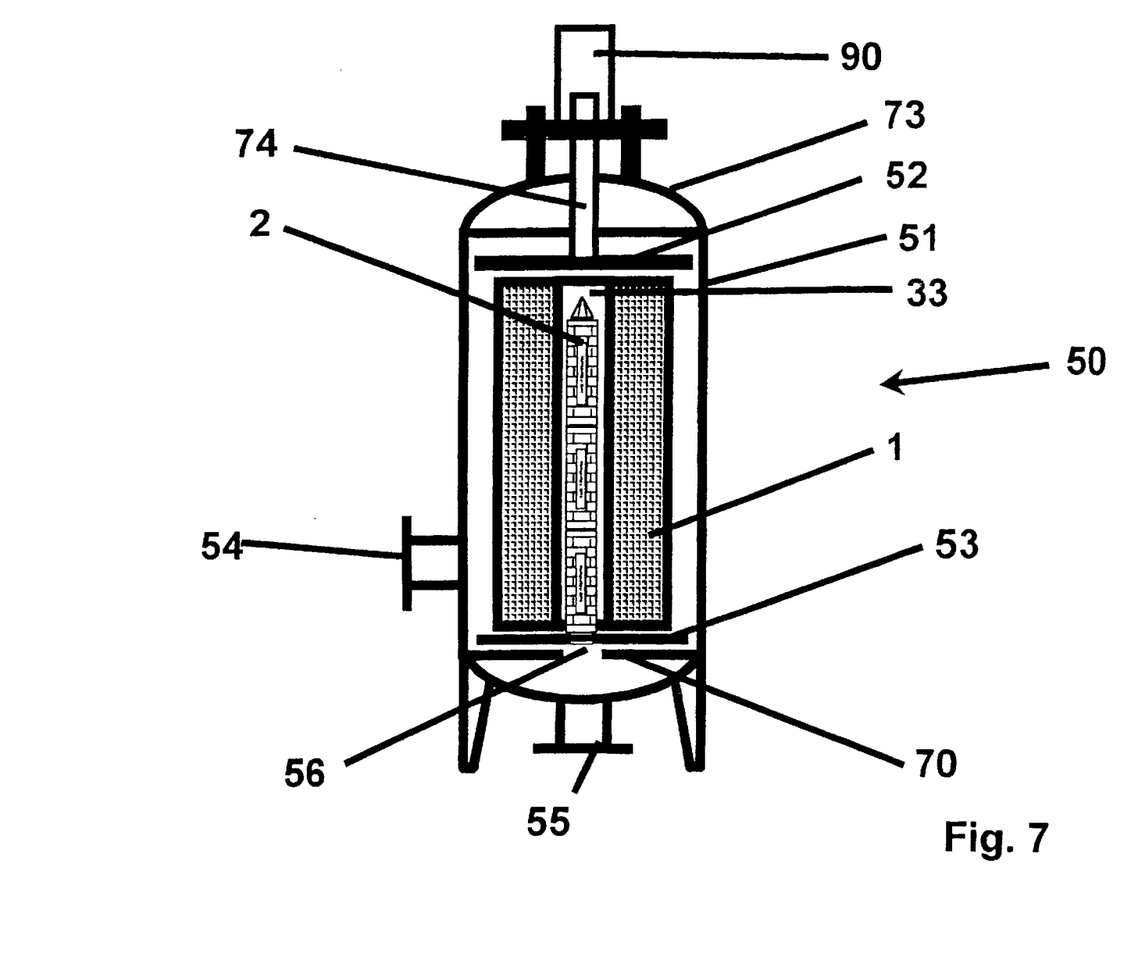

FIG. 7 shows another embodiment which differs from the embodiment shown in FIG. 6 simply in that there is a filter cartridge 2 in the collection opening 33. In this way further filtration can take place to further increase the purity of the filtered fluids or to reliably sterilize the fluid with membrane filtration. It is important that the length of the filter cartridge 2 be shorter than the minimum length of the filter module 1 with maximum pressing, so that the filter cartridge 2 cannot be flattened. Preferably therefore there is path limitation for the pressing device 90.

Figure 8:
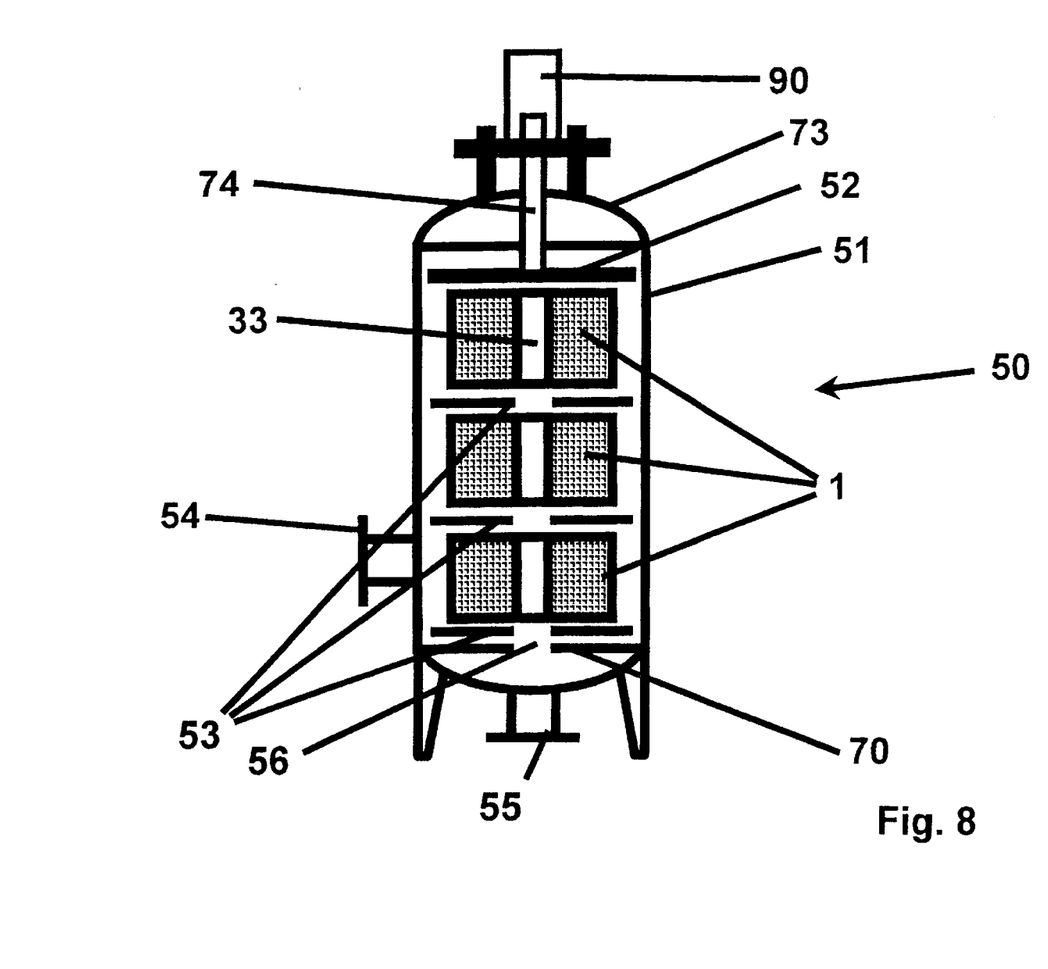

FIG. 8 shows another embodiment in which three filter modules 1 are located on top of one another. On the carrier plate 70 rests the lower end plate 53 of the lowermost filter module 1. The upper end plate of the lower filter module 1 at the same time forms the lower end plate of the middle filter module and the same applies to the arrangement of the uppermost filter module. In this embodiment the middle end plates can also be called intermediate bearings. The upper end plate 52 is movable and, as has been explained above in conjunction with the other embodiments, is connected to the pressing device 90. Here joint pressing of all three filtration modules 1 takes place by means of the pressing device 90. The advantage of this arrangement is that a high structural height of the filtration device 50 can be achieved. Handling is facilitated by division into three individual modules which can each be removed from the filtration housing 51 with their pertinent lower end plate.

Figure 9:
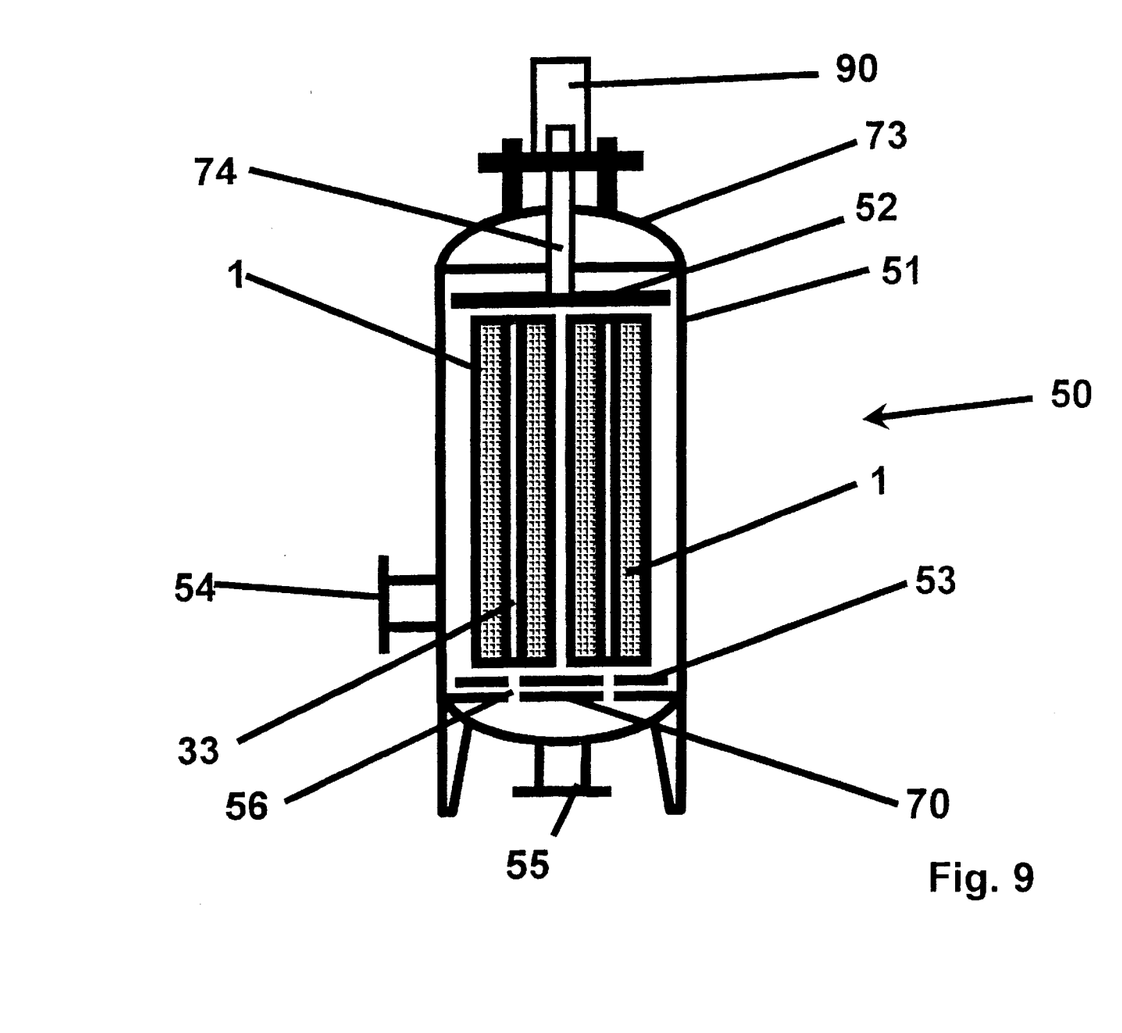

FIG. 9 shows another embodiment. Here two filtration modules 1 are installed in parallel such that they can be pressed by a common pressing device 90 and a common end plate 52 and 53. It is also possible to provide for each filtration module its own pressing device.

Figure 10:
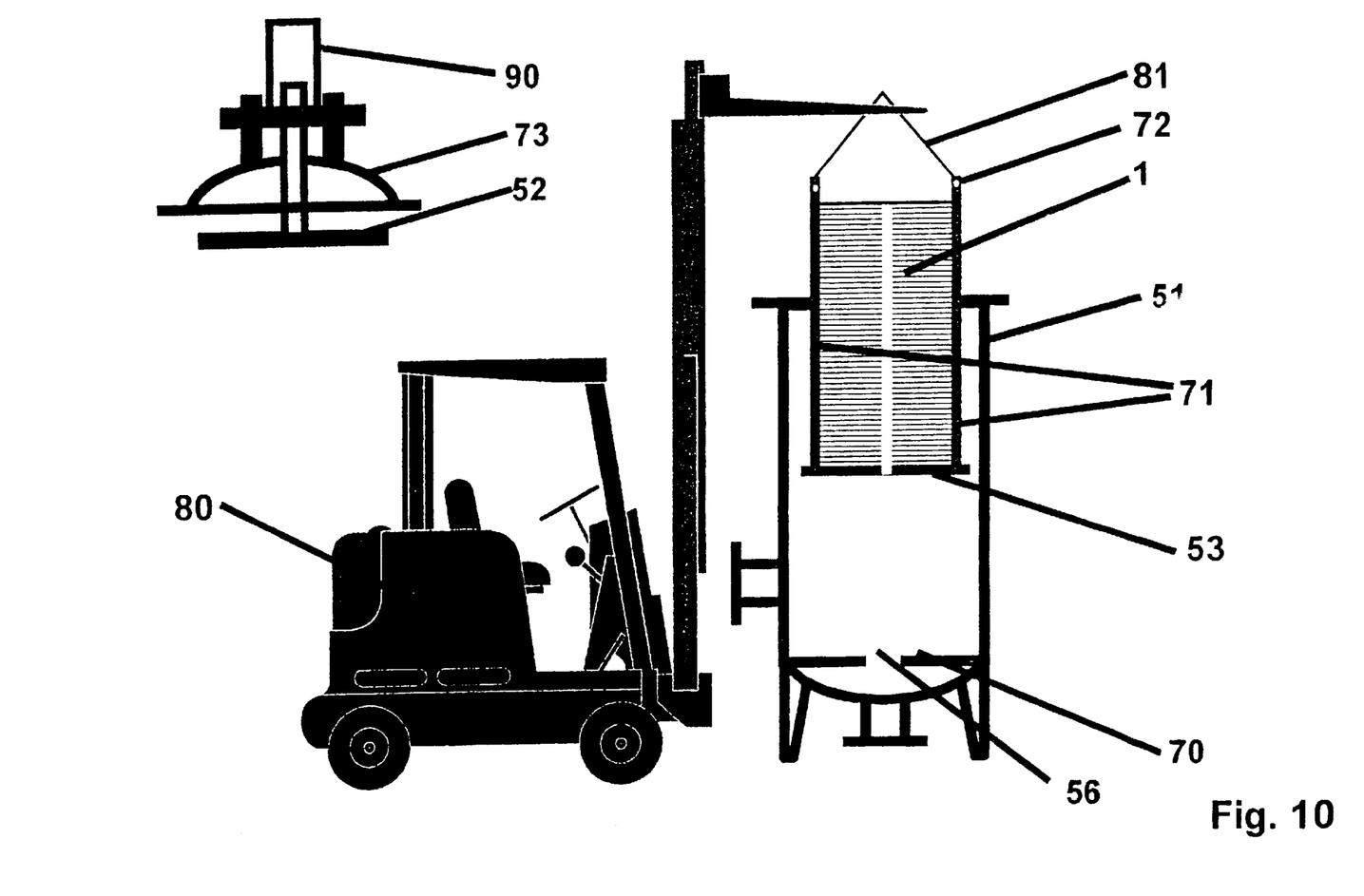

FIG. 10 shows installation of a filter module 1. First of all the filtration housing 51 is opened by removing the cover 73 with the pressing device 90 and the upper end plate 52. Then for example using a fork lift 80 and a lifting device which is not shown the filter module 1 is lifted out of the filter housing 51. In doing so the filter module 1 hangs on a carrying means 81, for example in the form of a cable which engages the rods 71 on the journals 72. After the module 1 has been placed in the filter housing 51, the rods 71 are removed before the container cover 73 with the pressing device 90 is placed back on the housing 51. Then the filter module 1 is pressed by the pressing device 90 and over the end plate 52.

Figure 11:
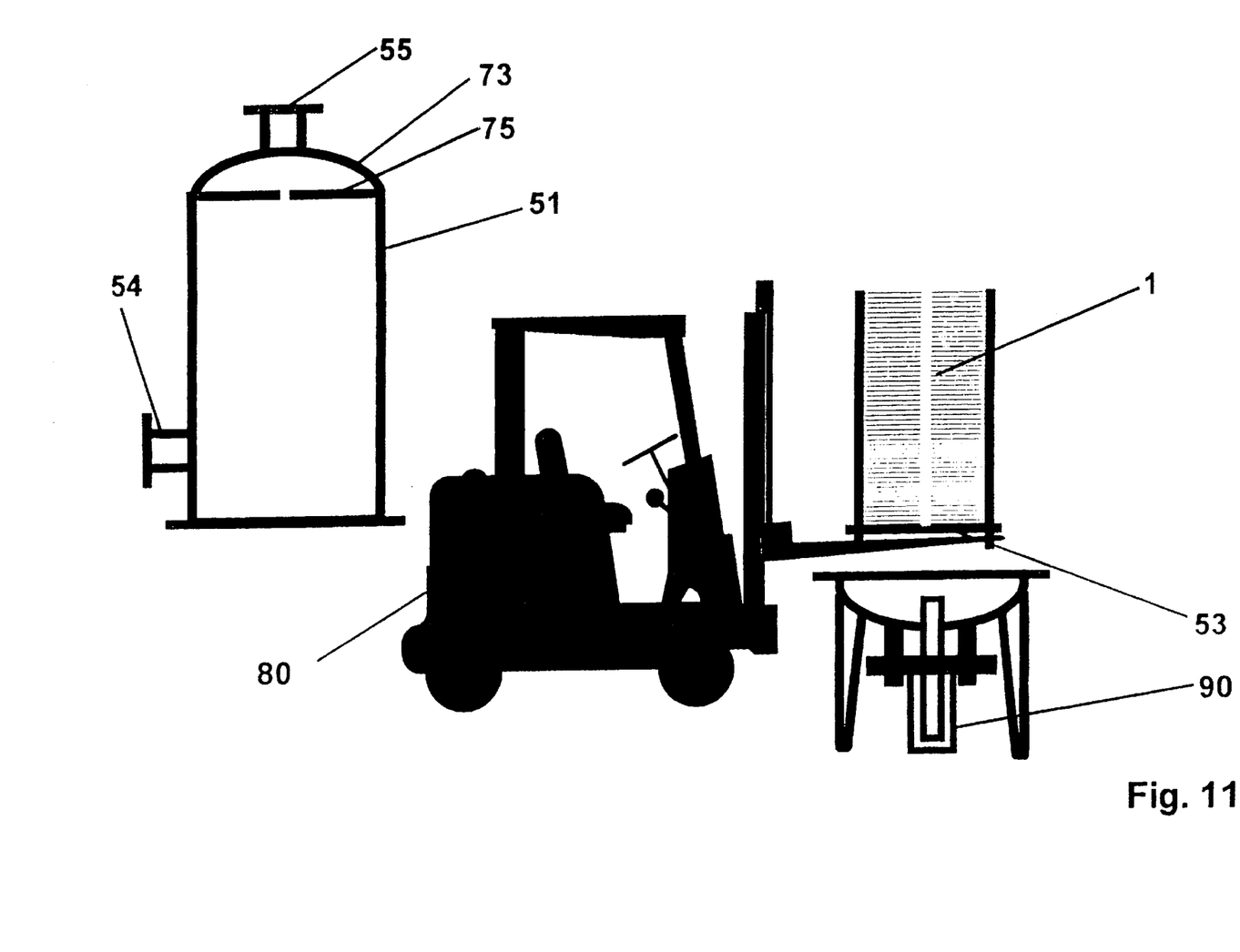

FIG. 11 shows another embodiment in which the filter housing 51 with the cover 73 forms a unit so that the housing is opened by removing the cover together with the housing 51. In this case the filter module 1 stands on a movable lower end plate 53 and is pressed against the upper support plate 75 by means of the pressing device 90 which lies under the housing. The fluid enters the housing 51 through the side connection 54 and leaves it after filtration by the filter module 1 through the upper connection 55. In addition, in this case drain valves which are not shown are attached to the bottom of the filter housing to ensure complete emptying. The advantage of this construction is that the relatively heavy pressing means 90 is connected to the fixed part of the filter housing 51 so that the structure is more stable and at the same time the connection lines can be laid permanently.

What is claimed is:

1. Filtration device comprising:
   a housing which includes an inlet opening for supplying an unfiltered material thereto, and an outlet opening for removing a filtered material therefrom; and
   at least one filter module positioned within the housing and having two end plates; wherein
   the filter module includes filter elements of deep bed filter material which are stacked one on top of another, wherein the filter elements have
   (i) an outside peripheral surface which acts as a flow surface, and
   (ii) first and second types of openings which are unconnected to one another and which establish narrow longitudinal structures, and wherein
   said first and second types of openings together form an inner structure that establishes a grid-like structure of substantially uniform widths of filtration area, wherein said filtration area is substantially uniform throughout the deep bed filter material whereby boundary surfaces are formed by the deep-bed filter material to thereby establish a flow surface for one of the filtered material and the unfiltered material, and wherein
   at least one filter element has a connecting opening that establishes a connection from at least one of said first type of openings to a peripheral surface of said at least one filter element, and wherein
   at least one of said two end plates has openings that are connected to the at least one inner structure, and wherein the filter elements are stacked on top of one another such that only the first type of openings are connected to one another and only the second type of openings are connected to one another to thereby respectively form filtered material channels and unfiltered material channels within the filter module.

2. Filtration device as claimed in claim 1, wherein the sum of all flow surfaces of a filter element is larger than the sum of:
   (1) an outer peripheral surface of an extremely small convex body which jackets the filter element; and
   (2) an outer peripheral surface of an extremely large convex body which is inscribed into any opening of the filter element.

3. Filtration device as claimed in claim 1, wherein the filter elements have at least one collection opening for forming a collection channel for the filtered material in the filter module.

4. Filtration device as claimed in claim 1, wherein the filter elements lie directly on top of one another.

5. Filtration device as claimed in claim 1, wherein the filter elements are cemented or bonded one to another.

6. Filtration device as claimed in claim 1, which includes one intermediate layer between each two filter elements.

7. Filtration device as claimed in claim 6, wherein the intermediate layer is selected from a film, a filter element without openings or a metal plate.

8. Filtration device as claimed in claim 1, wherein the filter module is located vertically in the filtration housing.

9. Filtration device as claimed in claim 1, wherein one of two end plates is movably supported.

10. Filtration device as claimed in claim 9, which includes a pressing device on the filtration housing which is engageable with the movable end plate.

11. Filtration device as claimed in claim 1, which includes at least one fixing element which fixes the filter disks in a relative position to one another during installation.

12. Filtration device as claimed in claim 11, wherein the fixing element is a component of a holding means which is connected to at least one end plate.

13. Filtration device as claimed in claim 12, wherein the holding means has two rods (17), and the filter elements include recesses which form outside grooves of the filter module, wherein the rods fit into the outside grooves of the filter module.

14. Filtration device as claimed in claim 1, wherein the filter elements include collection openings, and wherein the filtration device includes retention means in the collection channel of the filter module, the channel being formed by the collection openings of the filter elements.

15. Filtration device as claimed in claim 14, wherein the retention means is a cartridge filter, with or without pleating, or a screen filter.

16. Filtration device as claimed in claim 14, wherein the retention means can be detachably fastened to one of the two end plates.

17. Filtration device as claimed in claim 1, wherein at least one end plate distributes unfiltered material into the unfiltered material channels of the filter module and/or collects the filtered material.

18. Filtration device as claimed in claim 1, wherein at least one of the end plates has distributor channels which are connected to the corresponding openings of the first type and/or second type.

19. Filtration device as claimed in claim 1, which comprises several filter modules are located next to one another and/or over one another and are separated from one another by intermediate plates.

20. Filtration device comprising:
   a housing which includes an inlet opening for supplying an unfiltered material thereto, and an outlet opening for removing a filtered material therefrom; and
   at least one filter module positioned within the housing and having two end plates, wherein
   the filter module includes filter elements of deep bed filter material which are stacked on top of one another and which have at least one inner structure formed by an opening which defines a boundary surface which is formed by the deep-bed filter material to thereby establish a flow surface for one of the filtered material and the unfiltered material, and to establish a grid array of uniform widths of filtration area in the deep bed filter material so as to achieve effective filtration action which is uniform throughout the deep bed filter material, and wherein
   at least one end plate is made so as to distribute the unfiltered material into the unfiltered material channels of the filter module and/or collect the filtered material.

* * * * *